(12) United States Patent
Moussa et al.

(10) Patent No.: US 8,749,371 B2
(45) Date of Patent: Jun. 10, 2014

(54) DIFFRACTIVE SIGNALING DEVICE FOR REAR-VIEW MIRROR WITH 2D/3D DISPLAY

(75) Inventors: Hassan Moussa, Illkirch (FR); Idriss El Hafidi, Strasbourg (FR); Laurent Tupinier, Reichstett (FR)

(73) Assignees: Delphi Technologies, Inc., Troy, MI (US); Universite de Strasbourg, Strasbourg (FR)

( * ) Notice: Subject to any disclaimer, the term of this patent is extended or adjusted under 35 U.S.C. 154(b) by 112 days.

(21) Appl. No.: 13/516,262

(22) PCT Filed: Dec. 21, 2010

(86) PCT No.: PCT/EP2010/070410
§ 371 (c)(1),
(2), (4) Date: Jun. 15, 2012

(87) PCT Pub. No.: WO2011/083042
PCT Pub. Date: Jul. 14, 2011

(65) Prior Publication Data
US 2012/0262288 A1 Oct. 18, 2012

(30) Foreign Application Priority Data

Jan. 6, 2010 (FR) ...................................... 10 50046

(51) Int. Cl.
*B60Q 1/34* (2006.01)
(52) U.S. Cl.
USPC ......... 340/475; 359/601; 250/237 R; 362/487
(58) Field of Classification Search
USPC ............... 340/475, 425.5; 359/601, 602, 608, 359/838; 250/237 R; 362/487, 494, 498
See application file for complete search history.

(56) References Cited

U.S. PATENT DOCUMENTS

| 5,165,772 A | 11/1992 | Wu |
| 5,938,320 A | 8/1999 | Crandall |
| 6,918,685 B2 * | 7/2005 | Bukosky et al. .............. 362/301 |
| 7,524,092 B2 * | 4/2009 | Rodriguez Barros et al. .............................. 362/494 |
| 2006/0215413 A1 | 9/2006 | Mathieu et al. |
| 2007/0058257 A1 | 3/2007 | Lynam |
| 2008/0025034 A1 * | 1/2008 | Mathieu ........................ 362/494 |
| 2008/0309510 A1 * | 12/2008 | Mandagaran ............ 340/815.45 |
| 2009/0316422 A1 * | 12/2009 | Lynam ......................... 362/494 |
| 2010/0220406 A1 * | 9/2010 | Cuddihy et al. .............. 359/843 |
| 2013/0002876 A1 * | 1/2013 | Pastrick et al. ............... 348/148 |
| 2013/0176145 A1 * | 7/2013 | Yu, Xiao Lin ................ 340/905 |

FOREIGN PATENT DOCUMENTS

EP        1591314 A1 * 11/2005
WO   2006101580 A2   9/2006

OTHER PUBLICATIONS

International Search Report dated Feb. 7, 2011.

* cited by examiner

*Primary Examiner* — George Bugg
*Assistant Examiner* — Edny Labbees
(74) *Attorney, Agent, or Firm* — Lawrence D. Hazelton

(57) ABSTRACT

Signaling device designed to be arranged on the reflective element forming a mirror of a rear-view device comprising at least an illumination unit and at least an optical device, characterized by the fact that the optical device includes a symbol generation unit which is provided with at least a diffraction grating designed to form an illuminated image corresponding to a first illuminated symbol, the symbol generation unit being generally transparent and the diffraction grating being formed on the surface of the symbol generation unit without affecting its transparency.

11 Claims, 4 Drawing Sheets

DIFFRACTIVE SIGNALING DEVICE FOR REAR-VIEW MIRROR WITH 2D/3D DISPLAY

CROSS-REFERENCE TO RELATED APPLICATION

This application claims the benefit under 35 U.S.C. §371 of published PCT Patent Application Number PCT/EP 2010/070410, filed Dec. 21, 2010, and was published as WO2011/083042A1 on Jul. 14, 2011, the entire contents of which is hereby incorporated by reference herein.

TECHNICAL FIELD OF INVENTION

The present invention relates to a diffractive signaling device for a rear-view mirror with 2D/3D display in particular for a land motor vehicle.

BACKGROUND OF INVENTION

The present invention relates more particularly to a rear-view device for a land motor vehicle including: a reflective element forming a mirror which allows a main user to observe a zone situated to the rear of the rear-view device, and an illuminated display system comprising at least a first light source and at least an optical device allowing orientation of the light beam produced by the source in a determined direction orientated towards the rear and situated outside the field of view of the main user (the driver) in order to display at least a first illuminated signal in the rear-view zone, the said first illuminated signal being intended to be seen by other observers than the main user (drivers of other vehicles).

Such a type of device is described for example in the document U.S. Pat. No. 5,436,741. In this document, the mirror is mounted by its front face on a support which is provided with a housing containing a filament lamp. The mirror is partially transmissive and includes on its front face, opposite the housing, a transparent plate provided with a holographic element solely intended to orientate and control the angle of divergence of the light rays emitted by the lamp with a defined divergence.

This device has certain disadvantages. In fact, the illuminated display system is relatively bulky and it only produces a relatively blurred illuminated signal. Moreover, it requires the use of a partially transmissive mirror which on the one hand increases the cost of the mirror and degrades the "rear-view" function, and on the other increases the energy consumption due to the loss due to the partial transmissivity of the mirror. Also, the fact that the mirror must be semi-reflective in the display zone means that, in case of accumulation of dust on the surface of the mirror, the brightness will be reduced and in certain cases the signal will be invisible.

It should also be noted that in the prior art two types of signal were envisaged: absence of signal form (in this case the function is reduced to the lighting of a zone in the rear-view mirror without any form: arrow or other) with a limitation linked to the need to position the light source in a precise location of the rear-view mirror, and a light guide drawing the form of the signal (arrow, triangle or other) with an assembly of a plurality of light sources. This constitutes a major limitation as a guide must correspond to each symbol and therefore for a plurality of symbols there must be a sufficient capacity to incorporate the guides at distinct locations which is very difficult and requires a capacity much greater than the capacity available in a rear-view mirror, in addition to the need to have a plurality of light sources involving a high level of electrical consumption and a problem of heat dissipation.

SUMMARY OF THE INVENTION

The present invention is intended to resolve the problems mentioned above by proposing a compact solution having a high energy efficiency and therefore more economical, while offering the possibility of performing additional display functions while respecting the usual capacity of the rear-view mirror and without introducing modifications to its architecture.

To this end, the present invention proposes a diffractive signaling device for a rear-view mirror with 2D/3D display in particular for a land motor vehicle. More precisely, the signaling device is designed to be arranged on the reflective element forming a mirror of a rear-view device. The rear-view device allows a main user to observe by reflection a zone situated to the rear of the rear-view device. The signaling device comprises at least an illumination unit and an optical device permitting orientation of the light beam produced by the illumination unit in a determined direction orientated towards the rear and situated outside the field of view of the main user in order to display at least a first illuminated signaling symbol in the rear-view zone defined by the rear-view device. The first illuminated symbol is intended to be seen exclusively by observers other than the main user.

In accordance with the teachings of the invention, the signaling device is characterized by the fact that the optical device includes a symbol generation unit which is provided with at least a diffraction grating designed to form an illuminated image corresponding to the first illuminated symbol when the illumination unit is lit, the said signal generation unit being generally transparent and the said diffraction grating being formed on the surface of the said unit without affecting its transparency, and by the fact that the illumination unit is so arranged relative to the symbol generation unit that the light beam enters the symbol generation unit through its front outer peripheral edge before being then diffracted to the rear by the diffraction grating to form the first illuminated symbol.

The device in accordance with the invention has the advantage of being particularly compact and of only requiring very few elements. In particular, the illumination unit adds very little thickness to the mirror, which allows the production of a very thin rear-view mirror and/or which facilitates incorporation of the illuminated lighting system in the rear-view mirror without any modification to its architecture, in particular in combination with the electrical device for correction of the orientation of the mirror present in the majority of rear-view mirrors, and this while offering the possibility of displaying a large number of two-dimensional or three-dimensional signaling symbols by means of the formation of illuminated symbols in the form of holograms.

In addition, the energy efficiency of the signaling system in accordance with the invention is particularly high which allows very bright signals to be obtained with a single light source such as an electroluminescent diode. Also, the system in accordance with the invention does not require a modification of the manufacturing process for assembly of the conventional rear-view mirror.

In accordance with other advantageous characteristics of the invention: the illumination unit includes an optical interface which is arranged between a light source and the outer peripheral edge of the symbol generation unit, the said optical interface collecting the light rays emitted by the light source and propagating them across the outer peripheral edge; the optical interface includes a reflector which collects the light rays emitted by the light source and which directs them towards a prism adjacent to the outer peripheral edge of the symbol generation unit; the symbol generation unit includes at least first and second diffraction gratings corresponding respectively to first and second illuminated symbols, and the signaling device includes first and second illumination units which respectively produce first and second light beams entering the symbol generation unit in first and second distinct non-parallel directions, the first and the second light beams co-operating respectively with the first and the second diffraction gratings to produce the first and the second illuminated symbols respectively; the two diffraction gratings include at least an overlap zone on the surface of the symbol generation unit so that the two associated illuminated symbols can be displayed at least partially in the same zone of the symbol generation unit; each diffraction grating is formed in relief by a process of analogue interference recording; each diffraction grating is formed from a computer-generated interference figure which corresponds to the combination of the interferences corresponding to the illuminated symbol to be generated; each diffraction grating is computer-generated and implemented on the transparent medium forming the symbol generation unit by micro-manufacturing techniques; the symbol generation unit is made of transparent plastics and the diffraction grating is formed on the surface of the said symbol generation unit by plastics injection or embossing.

The invention also proposes a rear-view device for a land motor vehicle, such as an exterior rear-view mirror, characterized by the fact that it is fitted with a signaling device in accordance with any one of the above characteristics, the symbol generation unit being arranged on the outer face of the reflective element.

In accordance with advantageous embodiments, the illuminated symbol associated with the first diffraction grating corresponds to an indication of change of direction of the vehicle and the illuminated symbol associated with the second diffraction grating corresponds to an indication of lighting of the stop lights of the vehicle.

Other symbols can be added, for example hazard warning lights, by superimposing additional diffraction gratings.

BRIEF DESCRIPTION OF DRAWINGS

Other characteristics, aims and advantages of the invention will become apparent on reading the following detailed description, with regard to the attached drawings, given by way of non-limiting example and in which.

DETAILED DESCRIPTION

In the remainder of the description, identical or similar elements will be designated by the same references.

Figure 1:
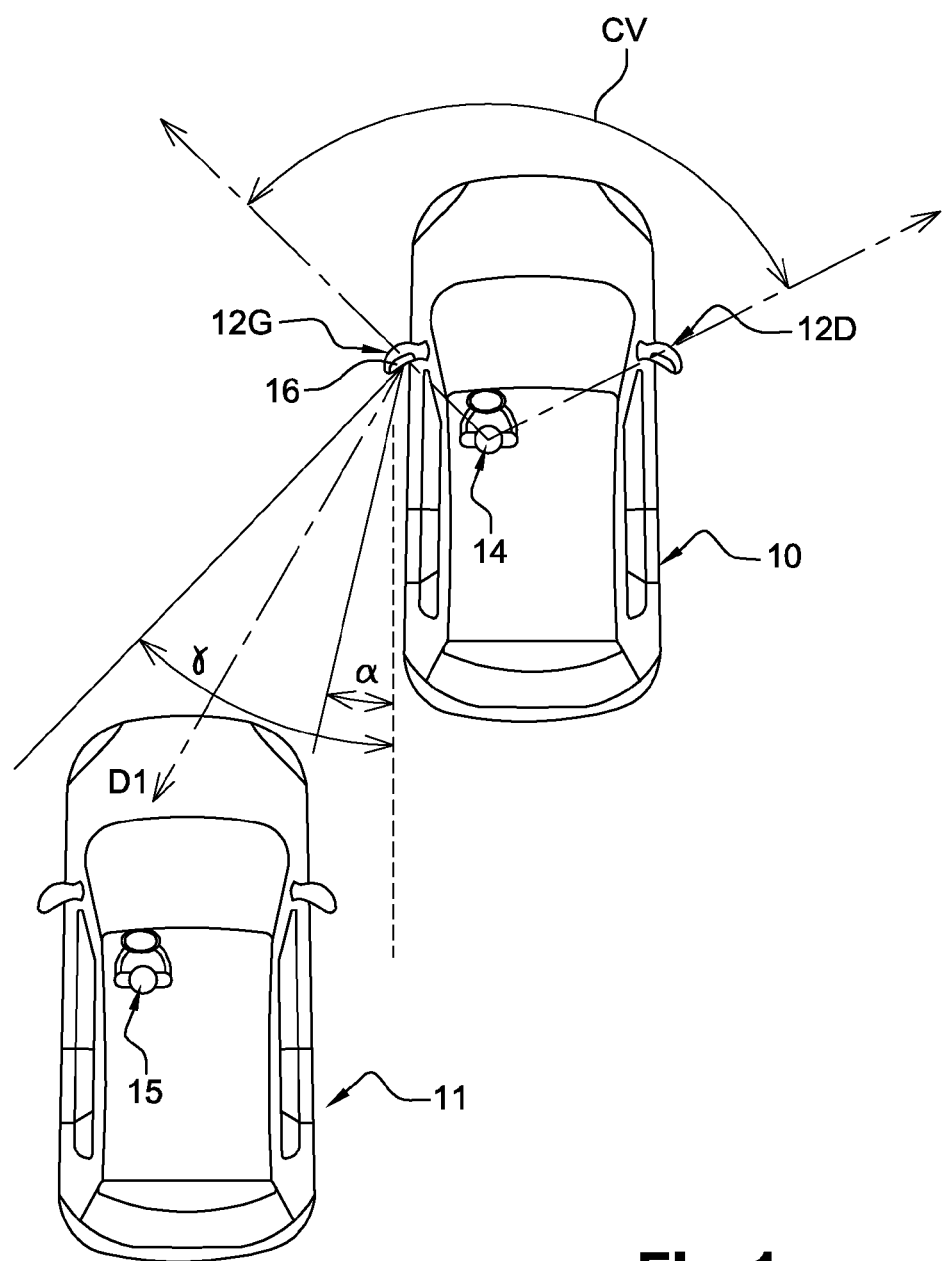
FIG. 1 is a view from above which diagrammatically shows a main motor vehicle fitted with exterior rear-view mirrors provided with signaling devices formed in accordance with the teachings of the invention and a second vehicle situated to the left rear of the main vehicle.

In FIG. 1 is shown diagrammatically a motor vehicle 10 fitted with rear-view devices 12 in accordance with the teachings of the invention. The rear-view devices 12 here consist of an exterior left rear-view mirror 12G and an exterior right rear-view mirror 12D.

In the remainder of the description will be used in non-limiting manner an orientation from front to rear in the direction of displacement when travelling forwards of the vehicle 10 and which corresponds to an orientation from top to bottom of FIG. 1.

Figure 2:
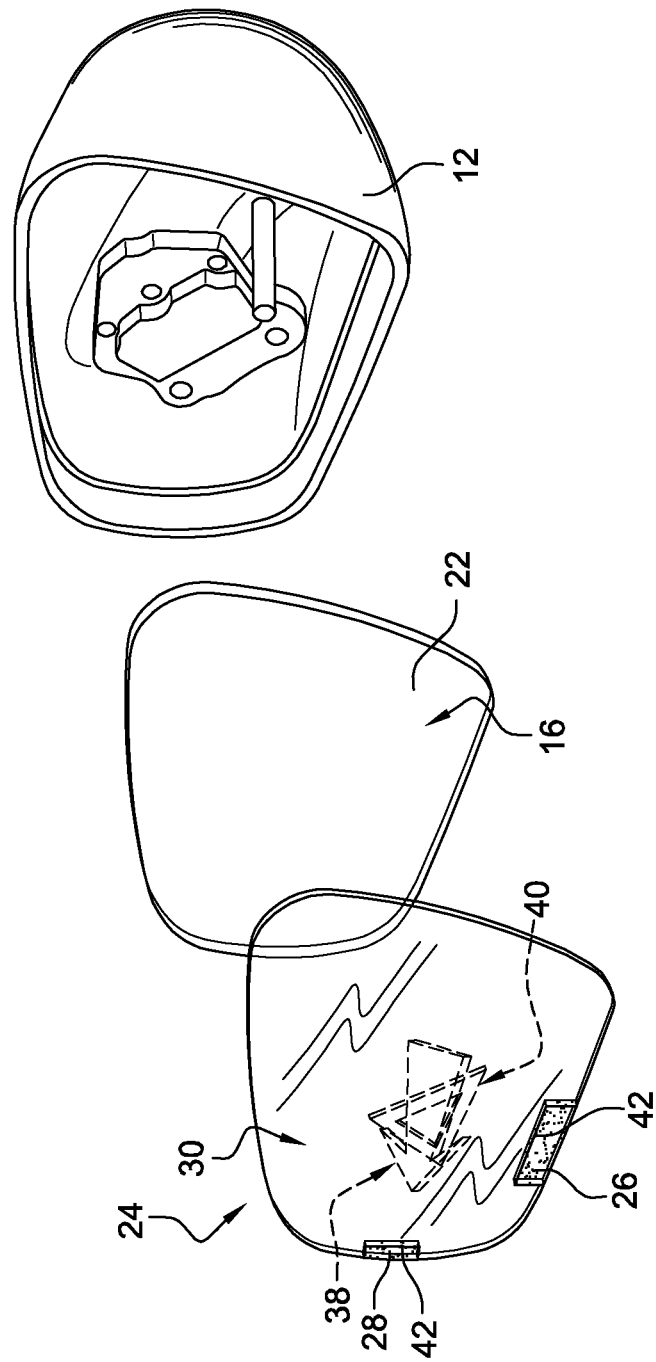
FIG. 2 is an exploded view which shows the left rear-view mirror of the main vehicle of FIG. 1.

Each rear-view device 12 is designed to allow the main user, here the driver 14, to view within his field of view CV a lateral zone situated towards the rear of the vehicle 10. To this end, each rear-view device 12, which is shown in more detail in FIGS. 2 to 4, includes a reflective element forming a mirror 16 in the form of a plate.

In accordance with the teachings of the invention, each rear-view device 12 is fitted with a signaling device 24 which includes at least an illumination unit 26, 28 and an optical device forming a signaling symbol generation unit 30. This symbol generation unit 30 also permits orientation of the light beam produced by the illumination unit 26, 28 in a general direction D1, the said light beam being defined by a first angle $\alpha$, relative to the longitudinal axis of the vehicle 10, and by a second angle $\gamma$ relative to the longitudinal axis of the vehicle 10. This direction D1 is oriented towards the rear and situated outside the field of view CV of the driver 14.

The signaling device 24 is designed to display at least one illuminated signal in the rear-view zone, the said illuminated symbol being intended to be seen exclusively by observers 15 other than the driver 14 of the main vehicle 10, for example the drivers 15 of other vehicles 11 able to be influenced by the behavior of the main vehicle 10. The illuminated symbol is therefore designed to be displayed superimposed on the image reflected by the mirror 16, in the display zone defined by the mirror 16. This signaling device 24 allows the rear-view function to be preserved without being degraded at all.

Figure 3:
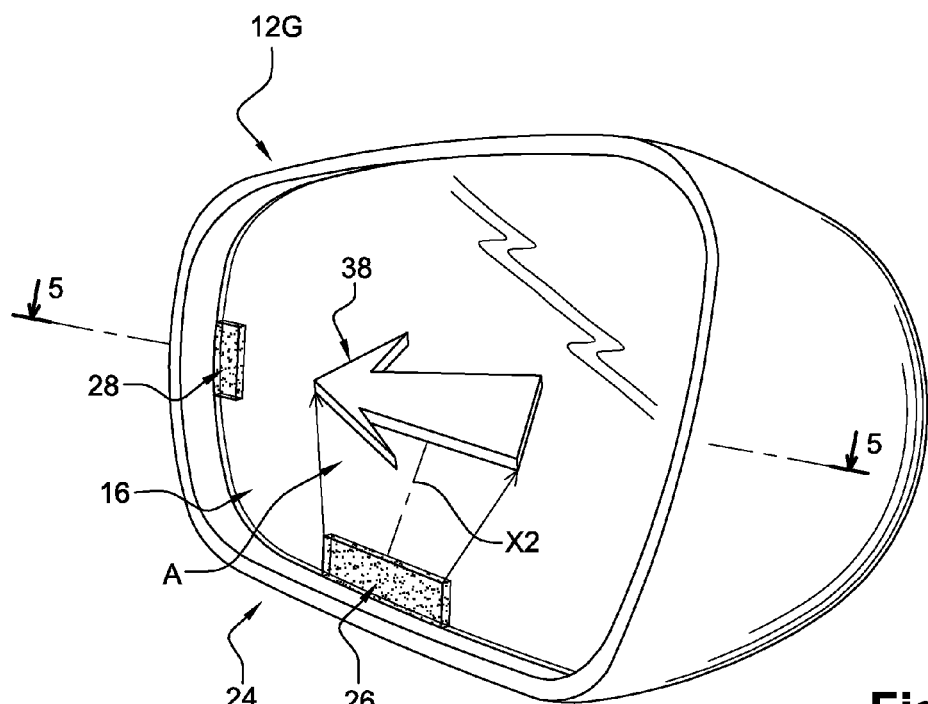
FIG. 3 is a perspective view which shows diagrammatically the rear-view mirror of FIG. 2 when a first illuminated symbol is displayed by the signaling device.
Figure 4:
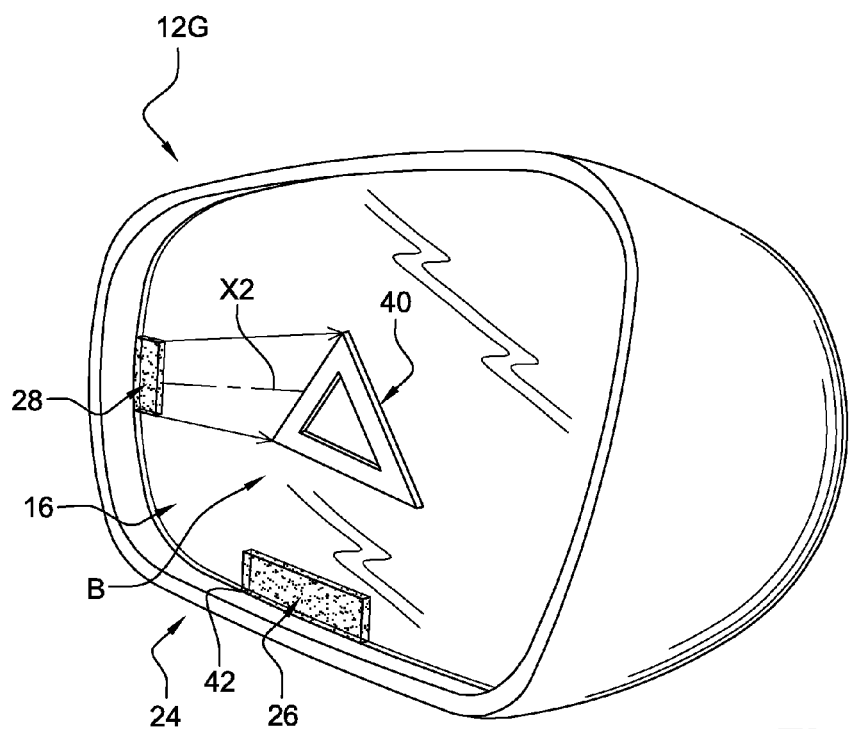
FIG. 4 is a view similar to that of FIG. 3 which shows the rear-view mirror when a second illuminated symbol is displayed by the signaling device.
Figure 5:
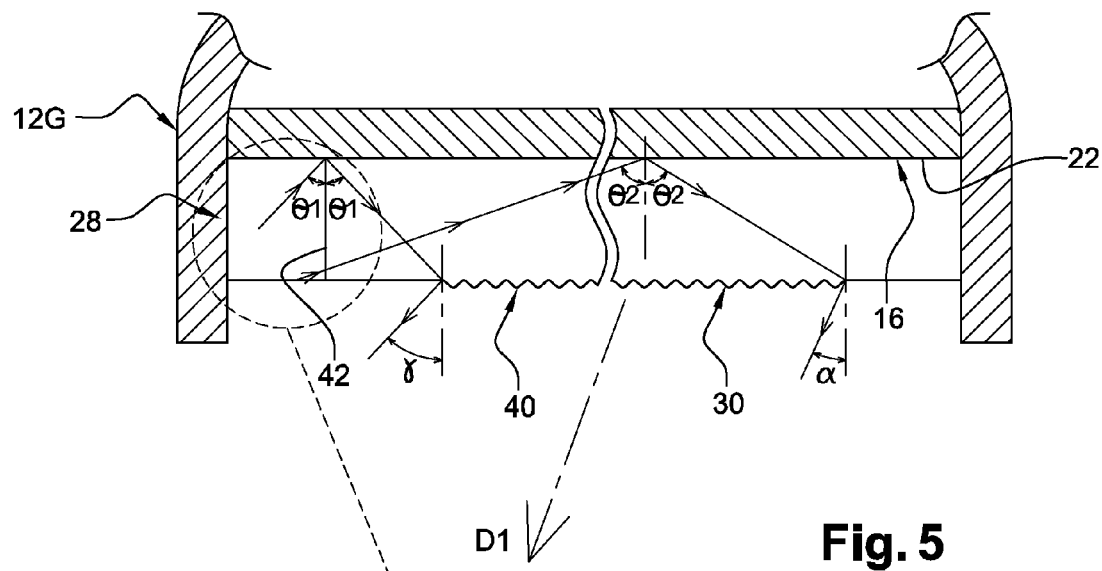
FIG. 5 is a view in section through the plane 5-5 which shows diagrammatically the signaling device fitted to the rear-view mirror of FIG. 2 and including a symbol generation unit and an illumination unit.
Figure 6:
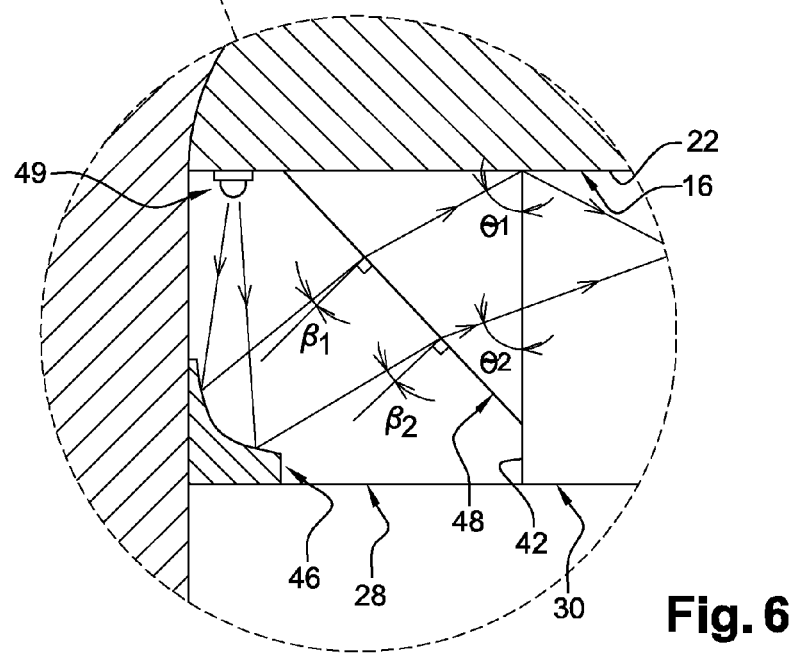
FIG. 6 is a detailed view of a part of FIG. 5 which shows the illumination unit of FIG. 5 and its optical interface.

In accordance with the embodiment show, the signaling device 24 includes two illumination units 26, 28 in order to allow display of two distinct illuminated symbols A, B preferably corresponding to a signal of change of direction, such as an arrow (FIG. 3), and a signal of lighting of the stop lights of the vehicle 10, such as a triangle (FIG. 4). The illumination units 26, 28 each contain a light source 49 (for example an electroluminescent diode) which is connected electrically to an electronic control unit (not shown) of the vehicle 10 which triggers its illumination in a suitable manner. As shown in FIGS. 5 and 6, these illumination units 49 permit orientation of the light produced by the source 49 towards the symbol generation unit 30 passing through the edge 42 of this.

In accordance with the teachings of the invention, the symbol generation unit 30, which is a completely transparent plate completely covering the mirror 16 and its rear-facing reflective surface 22, includes a superimposition of diffraction gratings 38, 40 which extend on the main face of the plate orientated towards the rear.

In accordance with the embodiment shown, the symbol generation unit 30 includes two diffraction gratings 38, 40, the first diffraction grating 38 co-operates with the first illumination unit 26 to generate the first signaling symbol A and the second diffraction grating 40 co-operates with the second illumination unit 28 to generate the second signaling symbol B. The diffraction gratings 38, 40 are preferably arranged in the same central zone of the rear-view mirror 12 so that they at least partially overlap each other, the diffractive optical elements forming the diffraction gratings 38, 40 being multiplexed on the surface of the symbol generation unit 30.

In accordance with the teachings of the invention, the light beam produced by each illumination unit 26, 28 enters the symbol generation unit 30 through its outer peripheral edge 42 before then being diffracted in the direction D1, in an angular sector defined by the angles α and γ, by the diffraction gratings 38, 40 to form the associated signaling symbols A and B. These signaling symbols A, B are here formed of holograms, by means of a suitable method of recording of the diffraction gratings 38, 40, which allows display of the signaling symbols A, B in three dimensions.

Advantageously, the illumination units 26 and 28 each include an optical interface, which is shown diagrammatically in FIGS. 5 and 6, and which is arranged between the light source 49 and the outer peripheral edge 42 of the symbol generation unit 30 to collect the light rays emitted by the light source 49 and propagate them across the outer peripheral edge 42 into the volume of the symbol generation unit 30 so as to illuminate the reflective surface 22. This light is then reflected by the reflective surface 22, at angles $\theta_1$, $\theta_2$, and crosses after the unit 30 to be diffracted by the diffraction grating 38, 40 at angles α and γ. This method of illumination has the advantage of not affecting the mechanical architecture of the rear-view mirror 12 and not increasing its mechanical capacity, which allows a compact and low-cost system to be had.

In accordance with the embodiment shown in FIGS. 5 and 6, in relation to the second illumination unit 28, the optical interface of this unit 28 is composed of a reflector 46 the inside surface of which is a part of a paraboloid. This reflector 46 permits collection of the light rays emitted by the source 49 and their direction towards a prism 48 adjacent to the outer peripheral edge 42 of the symbol generation unit 30 so that the majority of the light rays enter the volume of the symbol generation unit 30 to be firstly reflected by the reflective surface 22 of the mirror 16 and lastly diffracted by the second diffraction grating 40. The reflector 46 allows the light rays to be directed onto the prism 48 so that they describe an acute angle $\beta_1$, $\beta_2$ relative to the normal to the entry surface of the prism 48 which ensures virtually total refraction of the light inside the prism 48. This illumination allows an operating mode in transmission of the symbol generation unit 30 to be maintained while retaining a very compact capacity.

It is noted that each illumination unit 26, 28 is designed for the light rays from the corresponding light source 49 not to co-operate with the associated diffraction grating 38, 40.

Advantageously, the illumination units 26, 28 are arranged on the outer peripheral edge 42 of the symbol generation unit 30 so that their respective lighting beams illuminate the corresponding diffraction gratings 38, 40 in two distinct and non-parallel general directions X1, X2 (FIGS. 3 and 4) which correspond to the angles taken into consideration on the formation of the diffraction grating 38, 40 corresponding to each of the signaling symbols A, B. To this end, as shown in FIGS. 3 and 4, the first illumination unit 26 is arranged on the lower edge of the symbol generation unit 30, and the second illumination unit 28 is arranged on a lateral edge of the symbol generation unit 30.

In accordance with the example embodiment shown, the illumination units 26, 28 are arranged in complementary notches formed in the plate forming the symbol generation unit 30. In accordance with modified embodiments, the illumination units 26, 28 could be arranged outwith the plate, against its outer edge 42.

The invention works as follows. When the driver 14 activates his left turn signal to indicate a change of direction to the left, the electronic unit instructs the lighting of the first illumination unit 26 which causes the display of the illuminated symbol A of change of direction on the left rear-view mirror 12G. The driver 14 does not see this signal in the rear-view mirror 12G as the beam is diffracted outside the field of view CV of the driver 14 to allow him to retain good rear vision.

When the driver 14 presses on the brake pedal, the stop lights of the vehicle are lit and the second illuminated symbol B is displayed on the two rear-view mirrors 12G, 12D in the same manner as for the first symbol A this time by lighting the second illumination unit 28.

Obtaining the symbol generation unit 30 which includes a superimposition of diffraction gratings 38, 40, each of which corresponds to an illuminated symbol A, B, passes through a plurality of steps.

The first step consists of recording one by one the required symbols A, B. For this purpose the symbol A, B must be generated by a very high contrast display (LCD or other type). The expanded laser beam lights the display and the symbol A, B is then projected onto a diffusing screen. The interference between this light and a second laser beam is recorded. This operation must be repeated a number of times equal to the required number of symbols A, B. A separate diffraction grating 38, 40 is then obtained at each recording. Then, a laser beam is used which lights the primary diffraction grating. The recorded symbol A, B is then restored in image form in space. A holographic plate is then positioned in the place in which the diffracted image is clear. A second laser beam is used which interferes with the light of the diffracted image. This interference is recorded in the holographic plate which corresponds to a diffraction grating in relief which is called the transfer diffraction grating. This operation is repeated on the same holographic plate while each time changing the angle of attack of the reference beam and the primary diffraction grating having the corresponding symbol A, B. This operation is repeated as many times as the number of symbols A, B to be recorded. The final diffraction grating 38, 40 obtained is an element in relief containing all the symbols with an angle associated with each. This element will be used for the transfer onto a transparent medium (plastics for example).

This symbol generation unit 30 can also be obtained digitally by producing a computer-generated hologram. For this purpose the interference figure corresponding to each symbol A, B is to be generated. Then, using a micromanufacturing means, the interference figures are transferred in relief form onto a same master. This master is subsequently used to (mass) produce the symbol generation unit 30 on a transparent medium like plastics for example.

It is noted that the use of the technology presented in this invention allows three-dimensional illuminated signals A, B to be obtained which are more easily visible to observers external to the vehicle. Also, the surface (relief) diffraction gratings allow very high optical efficiency and consequently a minimum energy loss to be obtained. From this arises a major advantage of the product with the possibility of using a single light source of low brightness per symbol and using all its power for the creation of the display symbol.

Other modified embodiments of the invention can be envisaged. As explained above, the signaling system presented in this invention is not limited to the display of two signaling symbols. It can extend to a greater number of symbols without affecting the capacity of the rear-view mirror and without degrading the rear-view function.

The invention claimed is:

1. A signaling device arranged on a reflective element forming a mirror of a rear-view device of a motor vehicle, the rear-view device allowing a main user to observe, by reflection, a zone rearward of the rear-view device, said signaling device comprising:
   an illumination unit;
   an optical device configured to direct a light beam produced by the illumination unit toward the zone in order to display at least a first illuminated signaling symbol in the zone, said first illuminated signal configured to be seen exclusively by observers other than the main user; and
      a symbol generation unit equipped with a diffraction grating configured to form an illuminated image corresponding to the first illuminated symbol when the illumination unit is lit, said symbol generation unit being generally transparent, and said diffraction grating being formed on the surface of the symbol generation unit without affecting its transparency, wherein
   the illumination unit is arranged relative to the symbol generation unit so that the light beam enters the symbol generation unit through an outer peripheral edge of the symbol generation unit and is then diffracted towards the zone by the diffraction grating to form the first illuminated symbol, wherein
   the symbol generation unit includes a first diffraction grating and a second diffraction grating corresponding respectively to a first illuminated symbol and a second illuminated symbol, and
   the signaling device includes a first illumination unit and a second illumination unit that respectively produce a first light beam and a second light beam entering the symbol generation unit respectively in a first direction and second direction characterized as distinct and non-parallel to the first direction, the first and the second light beams co-operating respectively with the first and the second diffraction gratings to produce the first and the second illuminated symbols respectively.

2. The signaling device as described in claim 1, wherein the illumination unit includes an optical interface arranged between a light source and the outer peripheral edge of the symbol generation unit, said optical interface configured to collect light rays emitted by the light source and propagate the light rays across the outer peripheral edge.

3. The signaling device as described in claim 2, wherein the optical interface includes a reflector that collects the light rays emitted by the light source and directs the light rays towards a prism adjacent to the outer peripheral edge of the symbol generation unit.

4. The signaling device as described in claim 1, wherein the first diffraction grating and the second diffraction grating include at least an overlap zone on the surface of the symbol generation unit so that the first illuminated symbol and the second illuminated symbol can be displayed at least partially in the same zone of the symbol generation unit.

5. The signaling device as described in claim 4, wherein each diffraction grating is formed in relief by a process of analogue recording of interferences.

6. The signaling device as described in claim 5, wherein each diffraction grating is formed from a computer-generated interference figure which corresponds to the combination of the interferences corresponding to the illuminated symbol to be generated.

7. The signaling device as described in claim 5, wherein each diffraction grating is computer-generated and implemented on the transparent medium forming the symbol generation unit by micromanufacturing techniques.

8. The signaling device as described in claim 1, wherein the symbol generation unit is made of transparent plastics and the diffraction grating is formed on the surface of the said symbol generation unit by plastics injection or embossing.

9. A rear-view device of a land motor vehicle fitted with a signaling device as described in claim 1, the symbol generation unit being arranged on an outer face of the reflective element.

10. The rear-view device as described in claim 9, wherein the illuminated symbol associated with a first diffraction grating corresponds to an indication of change of direction of the vehicle.

11. The rear-view device as described in claim 10, wherein the illuminated symbol associated with a second diffraction grating corresponds to an indication of lighting of the stop lights of the vehicle.

* * * * *